(12) United States Patent  (10) Patent No.: US 8,236,461 B2
Gao  (45) Date of Patent: Aug. 7, 2012

(54) TYPE OF FUEL CELL BIPOLAR PLATES CONSTRUCTED WITH MULTIPLE PASS FLOW CHANNELS THAT CONTRACT, EXPAND, DEFLECT AND SPLIT REACTANT FLOWS FOR IMPROVING REACTANT FLOW DISTRIBUTION, DIFFUSION AND WATER MANAGEMENT

(76) Inventor: Yong Gao, Burnaby (CA)

( * ) Notice: Subject to any disclaimer, the term of this patent is extended or adjusted under 35 U.S.C. 154(b) by 685 days.

(21) Appl. No.: 12/319,697

(22) Filed: Jan. 12, 2009

(65) Prior Publication Data
US 2009/0214929 A1    Aug. 27, 2009

Related U.S. Application Data

(60) Provisional application No. 61/066,987, filed on Feb. 26, 2008.

(51) Int. Cl.
H01M 2/38 (2006.01)
(52) U.S. Cl. .................. 429/457; 429/456; 429/514
(58) Field of Classification Search .................. 429/210, 429/454–457, 512–514, 481–481
See application file for complete search history.

(56) References Cited

U.S. PATENT DOCUMENTS

| | | | |
|---|---|---|---|
| 6,358,642 B1 | 3/2002 | Griffith et al. | |
| 6,699,614 B2 | 3/2004 | Rock | |
| 6,706,436 B2 | 3/2004 | Molter | |
| 7,029,784 B2 | 4/2006 | Carlstrom | |
| 7,067,216 B2 | 6/2006 | Yan et al. | |
| 7,081,310 B2 | 7/2006 | DeFilippis | |
| 7,087,337 B2 | 8/2006 | Trabold et al. | |
| 7,115,336 B2 | 10/2006 | Revol | |
| 7,147,677 B2 | 12/2006 | Edlund | |
| 7,169,502 B2 | 1/2007 | Garceau | |
| 7,175,931 B2 | 2/2007 | Batfalsky et al. | |
| 7,195,836 B2 | 3/2007 | Lisi et al. | |
| 7,229,564 B2 | 6/2007 | Liu et al. | |
| 7,241,474 B2 | 7/2007 | Ji et al. | |
| 7,252,218 B2 | 8/2007 | Gayden et al. | |
| 7,258,263 B2 | 8/2007 | Sigler et al. | |
| 7,261,124 B2 | 8/2007 | Steidle et al. | |
| 7,285,353 B2 | 10/2007 | Lisi et al. | |
| 7,306,875 B2 | 12/2007 | Garceau | |
| 7,402,358 B2 | 7/2008 | Hanlon | |
| 7,459,227 B2 | 12/2008 | Rock et al. | |
| 7,468,216 B2 | 12/2008 | Hammerschmidt | |
| 2001/0041281 A1* | 11/2001 | Wilkinson et al. | 429/34 |

* cited by examiner

Primary Examiner — Thanhha Pham
(74) Attorney, Agent, or Firm — Han IP Law PLLC; Andy M. Han

(57) ABSTRACT

A type of fuel cell bipolar plates is constructed with multiple splitting and deflecting flow channels through which reactant flows are constantly contracted, expanded, split into more than one flow streams, and deflected in flow directions for improving reactant flow distribution, diffusion and water management.

15 Claims, 9 Drawing Sheets

Reactant Flow Direction

TYPE OF FUEL CELL BIPOLAR PLATES CONSTRUCTED WITH MULTIPLE PASS FLOW CHANNELS THAT CONTRACT, EXPAND, DEFLECT AND SPLIT REACTANT FLOWS FOR IMPROVING REACTANT FLOW DISTRIBUTION, DIFFUSION AND WATER MANAGEMENT

FIELD OF THE INVENTION

The present invention is related to a fuel cell. More specifically the present invention relates to a flow field of reactant distribution on a bipolar plate for a fuel cell.

BACKGROUND OF THE INVENTION

Fuel cells have been considered as a new power source and energy conversion device for various applications. There are a quite few different types of fuel cells, one of which is called PEMFC (Proton Exchange Membrane Fuel Cell). PEMFC is designed mostly with a stack of bipolar plates in between MEA (Membrane Electrode Assembly) is sandwiched, where a various kinds of flow fields are structured on the plates to distribute reactant fluid to reacting sites on MEA, and remove excess heat and water generated by electrochemical reaction within PEMFC. Years of practices have indicated that there are some drawbacks in designs of flow fields on the bipolar plates, such as reactant distribution efficiency, thermal and water management, and so on. Although many efforts have been made over the years, those issues are still major hurdles in the way to optimizing fuel cell performance and durability.

How to deliver sufficient reactant fluids to every part of the reacting sites effectively and how to remove heat and water generated during electrochemical reaction in the fuel cell while with cell temperature and wetness of membrane well maintained are deep in mind of every fuel cell plate designer. Therefore, there is a need to improve fuel cell plate design and optimize fuel cell performance and durability.

SUMMARY OF THE INVENTION

This invention discloses a flow field plate assembly for use in a fuel cell. The assembly comprises 1) a base plate with a major working face, 2) a group of small but specially shaped blocks structured on the major face, 3) a boundary element formed by a gas diffusion layer (GDL) placed on a membrane electrode assembly (MEA), and 4) flow channels constructed between the blocks and between the base plate and boundary element, where the height of the channels is set up by the height of the blocks.

Each block is shaped preferably with a curved front surface (for example, concave one), a curved rear surface (for example, convex one), two curved side surfaces and a top flat surface. All the blocks are structured across the base plate and aligned with longer dimension of blocks in a direction transverse to reactant flow direction.

All those unconnected and scattered blocks are grouped in a plurality of rows in a repeating and staggered pattern. There are certain distance kept between every two adjacent rows, and gaps remained between every two adjacent blocks in a row.

The plurality of blocks in plurality of rows is arranged with a centerline of each one of blocks coincided with centerline of the gap between two adjacent blocks in front and with centerline of the gap between two adjacent blocks behind.

Each one of blocks in the first row faces upcoming reactant flow with a concave surface, and deflects, splits and disturbs the flow and then forces reactant flow to go through gaps between every two adjacent blocks in the row, and with a concave surface, each one of the blocks in the following rows faces the flow coming through a gap between two adjacent blocks in front and continues to deflect, split and disturb the flow and further force the flow going through the distance passages formed by itself and adjacent blocks in front.

The flow channels are formed between the plurality of blocks which front concave surfaces deflecting the flow by larger than or equal to 90° and splitting the flow into more than one flow streams, and which rear convex surfaces further deflecting and forcing the flow by larger than or equal to 90° to go through the distance passages and following gaps.

There could be some areas in the channels acting as water pockets for droplet residence. However, in such flow heavily disturbed channels, those areas are largely limited in size so that flooding and water plug are unlikely formed, while small localized droplets may well become a humidification source.

Therefore, unlike many conventional designs using smooth and mostly laminar flow pattern or long shallow flow passages or increasing velocity and pressure drastically, this invention attempts to improve fuel cell flow field design dramatically by laying out a set of flow channels in which reactant flows are deflected, split, contracted and expanded in constant disturbing conditions, so that flow distributions, thermal and water management are well optimized.

Further areas of applicability of this invention will become obvious from the detailed descriptions provided hereinafter. It should be understood that the exemplary drawings and descriptions in detail, while indicating some preferred embodiment of this invention, are intended for purposes of illustration only and not intended to limit the scope of this invention.

DETAILED DESCRIPTIONS OF PREFERRED EMBODIMENTS

In accordance with the present invention, there is provided a novel design of a type of fuel cell bipolar plates constructed with multiple blocks specially shaped to form splitting and deflecting gas flow channels through which reactant flows are constantly contracted, expanded, split into more than one flow streams, deflected in larger than or equal to 90 degrees in flow directions, and kept in continuous disturbance status for improving flow distribution, diffusion and water management. The following descriptions of the preferred embodiments are only exemplary in nature and is in no way intended to limit said invention, its application or uses.

Figure 1:
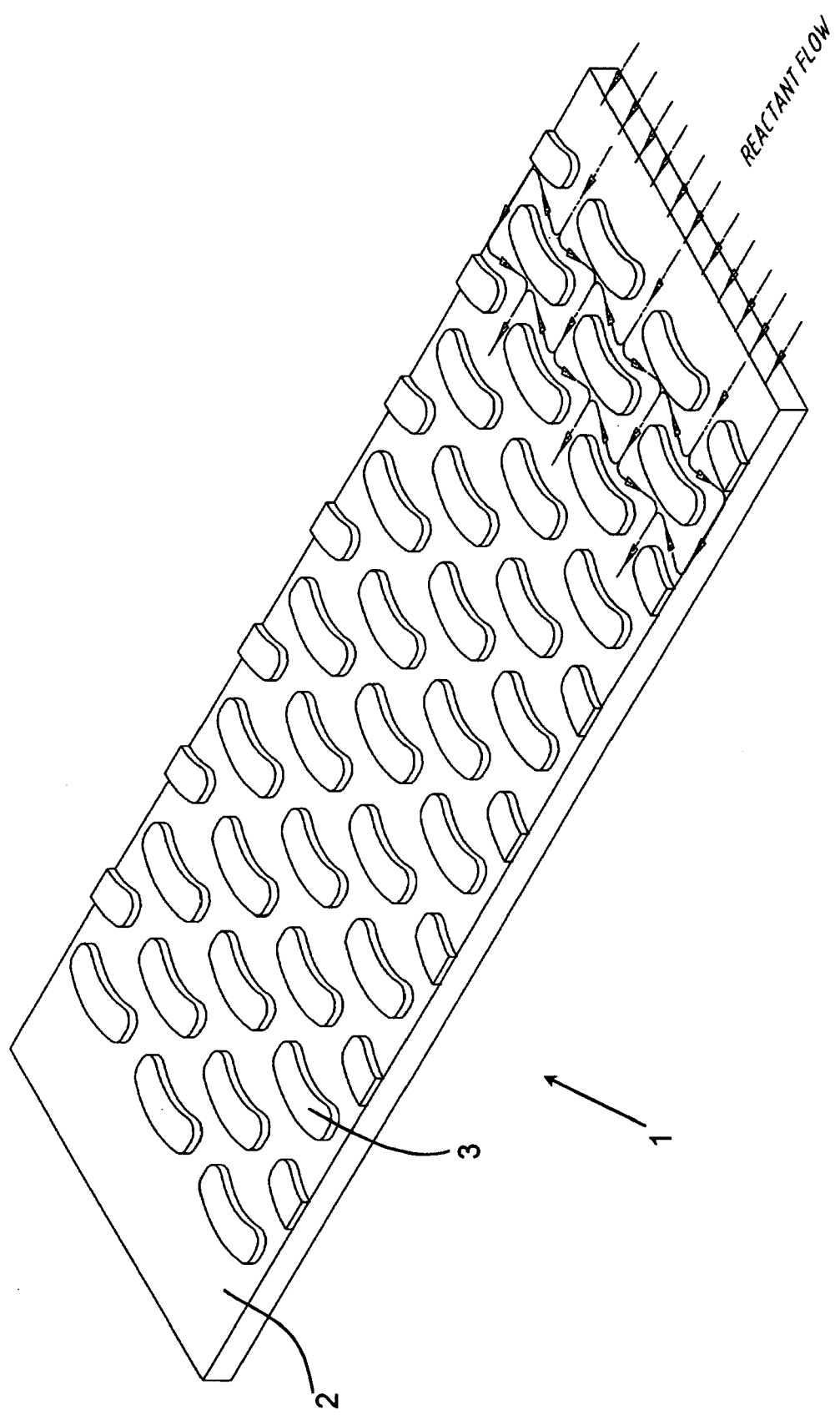
FIG. 1 is a schematic perspective illustration of the fuel cell bipolar plate with a set of phantom lines with arrows indicating reactant flow passages and directions in the flow channels structured with a number of rows of the blocks according to one of embodiments of the present invention.
Figure 2:
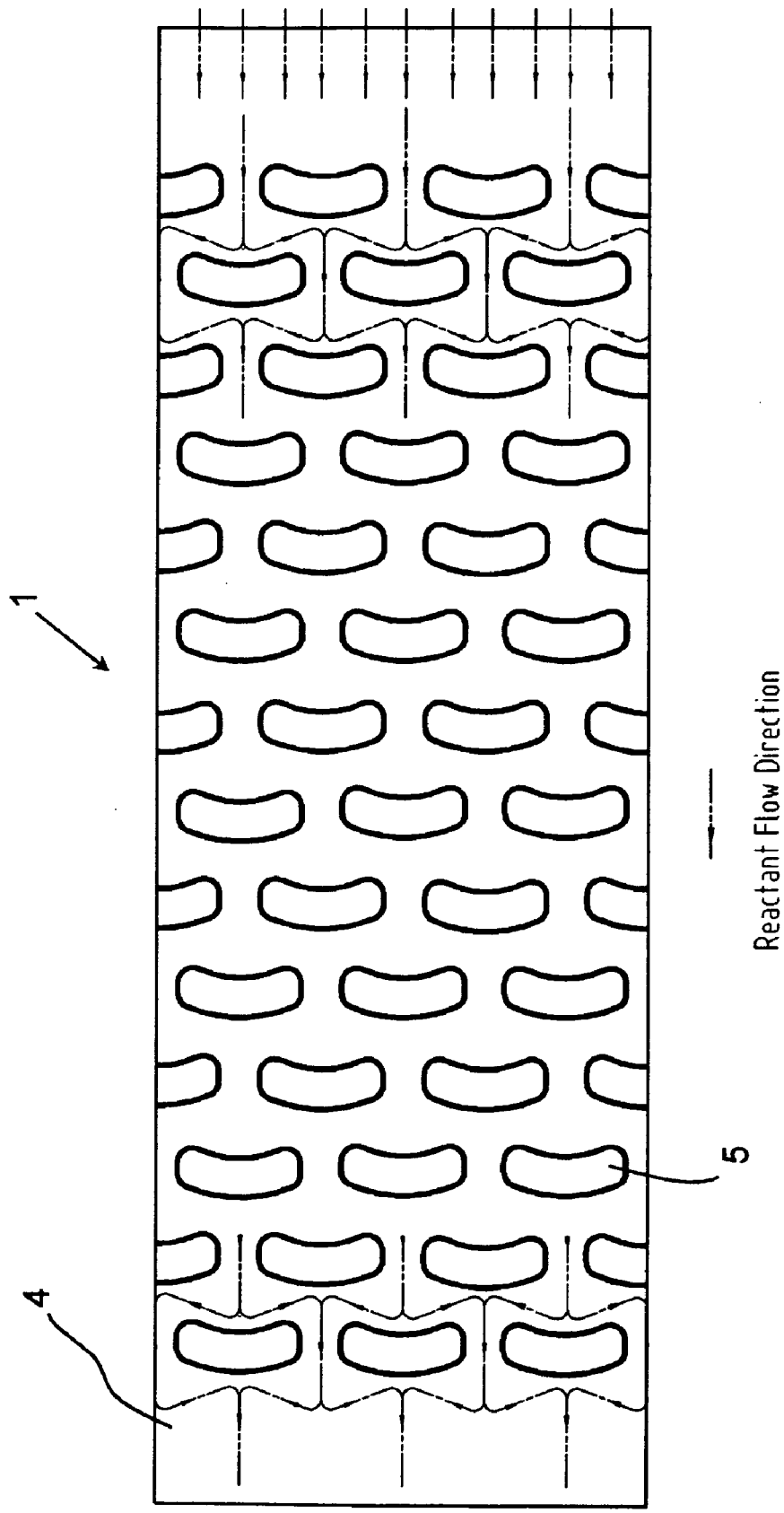
FIG. 2 is a plan view of FIG. 1 with more phantom lines and arrows at both right (inlet) and left (outlet) sides to illustration reactant flow directions and passages through the channels.

In reference to FIGS. 1 and 2 there are shown a schematic perspective view and its plan view of a section of the fuel cell bipolar plate 1 fabricated with plurality of reactant (i.e. both hydrogen-rich fuel and air) flow channels, where a reactant gas flow through the channels from right hand side to left, defined as the main flow direction, and the flowing passages and directions are indicated by phantom lines with arrows. The flow channels are formed on the base plate 2 or 4 with plurality of the blocks 3, 5.

Figure 3:
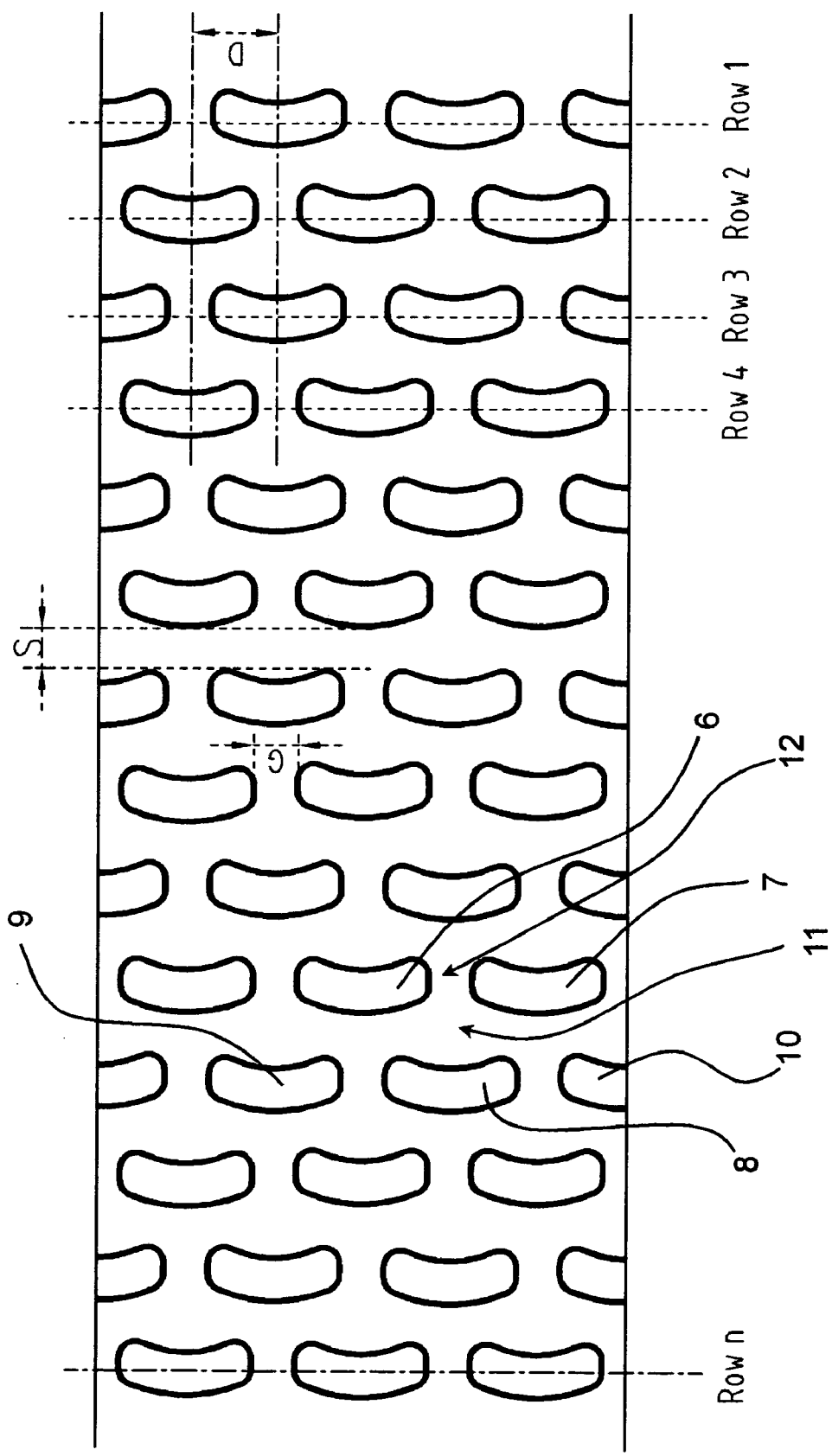
FIG. 3 is a schematic illustration of structural details of the fuel cell bipolar plate according to the present teaching.

As shown in FIG. 3, the blocks are grouped in plurality of rows marked as Row 1, Row 2, Row 3, Row 4 . . . Row n, and each row contains plurality of blocks, such as the blocks 6, 7 lined up in a row and the blocks 8, 9, 10 in another, having longer dimension of blocks aligned in transverse direction relative to the main flow direction and a gap G as a flow passage in between every two blocks. All rows are arranged in a staggered pattern that except the row marked as Row 1 that meets the upcoming reactant flow first, each one of the following rows has its blocks lined up behind in a distance S from the row in front and is staggered with a transverse patch D, so that blocks in all the following rows are aligned to face the gaps of the row in front, while gaps in the row are to face backs of the blocks of the row in front, for example, the block 8 faces the gap between the block 6 and 7, and the gap between the block 8 and 9 faces the back of the block 6. In other words, the blocks in all rows are eventually placed transversely against the main flow direction to deflect the upcoming flows and force them to split into more than one streams and change the flow directions locally.

FIGS. 1, 2 and 3 also illustrate a preferred embodiment with structural attributes of the blocks on the plate, where the blocks are formed in a crescent shape with the concave surfaces facing the upcoming reactant flow. Except that the blocks and gaps in the first row face the upcoming reactant flows only, structurally, the concave surfaces of all the blocks face the gaps in the row front, and the gaps between the blocks face the convex backs of the blocks in the front. For example, the block 8 has its concave surface positioned to face the gap 12 between the block 6 and 7, and the gap between the block 8 and 9 faces the (convex) back of the block 6. Blocks 6, 7, 8 are oriented in such a way that a wider space 11 is formed right after the narrow gap 12.

Figure 4:
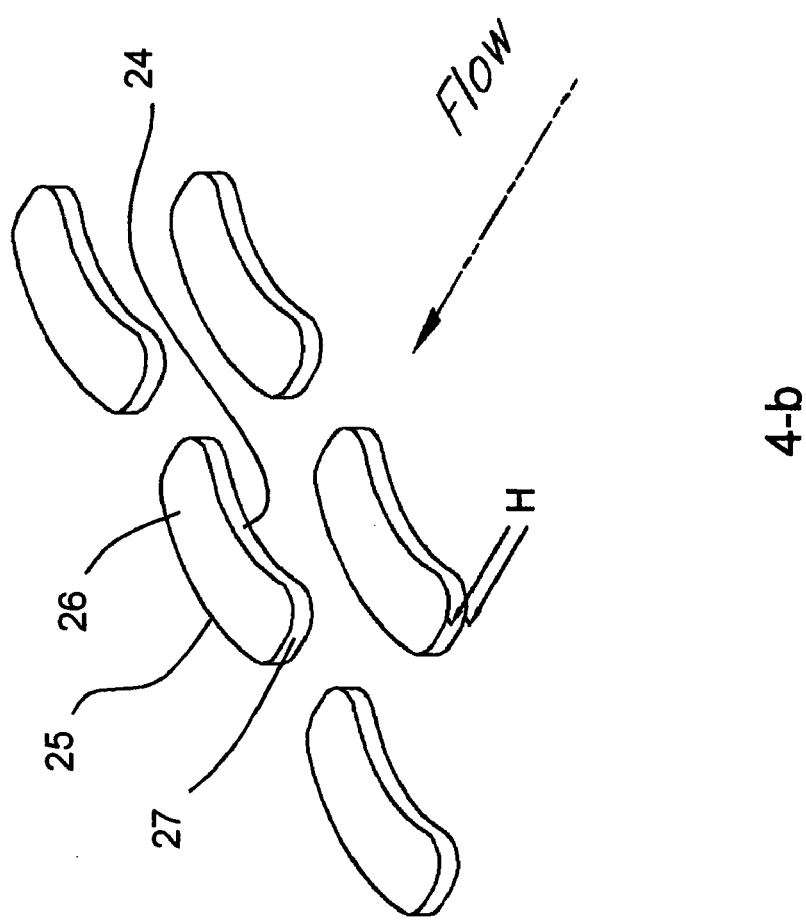
FIG. 4 contains two parts of illustrations, one of which, 4-$a$, shows structural attributes of a small group of the blocks and correlation between the blocks; the other, 4-$b$, gives a perspective view of the blocks according the present teaching.
Figure 4:
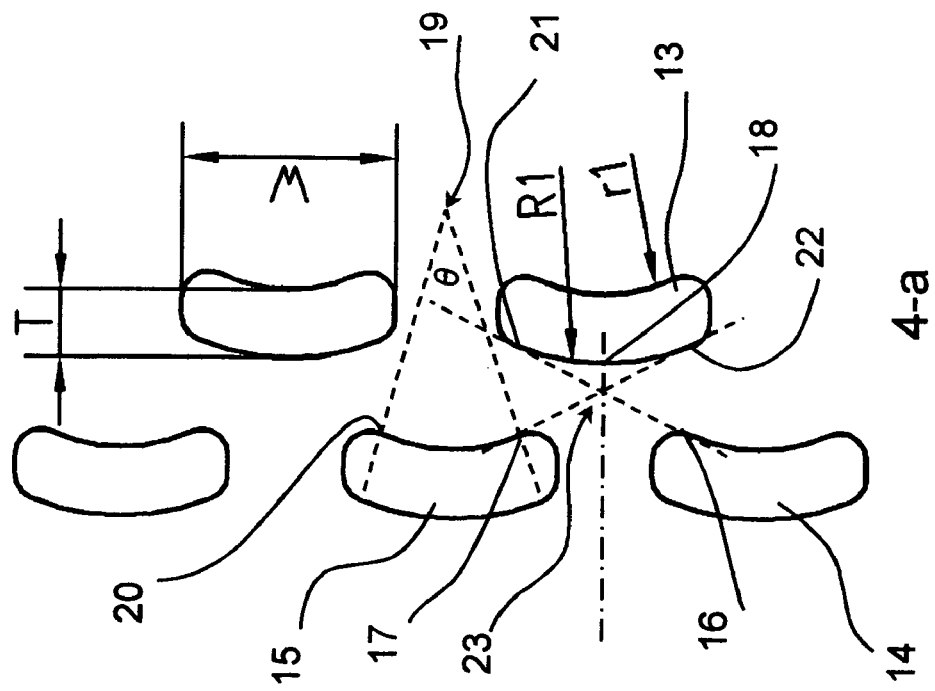

More detailed descriptions of the blocks are exemplarily depicted in FIG. 4, enlarged views of a few exemplary blocks. Every one of blocks, either 13, 14, 15 or all others, has height H, width W, thickness T, and preferably, ratio of W over T, or W:T is 3:1. In addition, a block has the top surface 26, the concave front surface 24 having radius r1 with the end points 17 and 20, the convex back surface 25 having radius R1, and the side surface 27. The surfaces 24 and 25 face the same central angle θ at the center point 19, so preferably a crescent block is aligned with the concave side facing a gap in the row front and convex side facing a gap in the row behind. Correlation of positions of three adjacent blocks 13, 14 and 15 is arranged in such a way that draw two tangent lines, as shown by two crossed dash lines in FIG. 4 4-*a*, from both end points 21 and 22 of the convex shape of the block 13 to intersect at the point 23, and extend both lines tangentially across the end points 16, 17 of the concave shape of the adjacent blocks 14, 15 in the row behind, respectively, then make the point 23 close enough to the center point 18 on the block 13 by adjusting shapes of the blocks and have both points 23 and 18 line up right on the centerline of the gap between the block 14 and 15.

Figure 5:
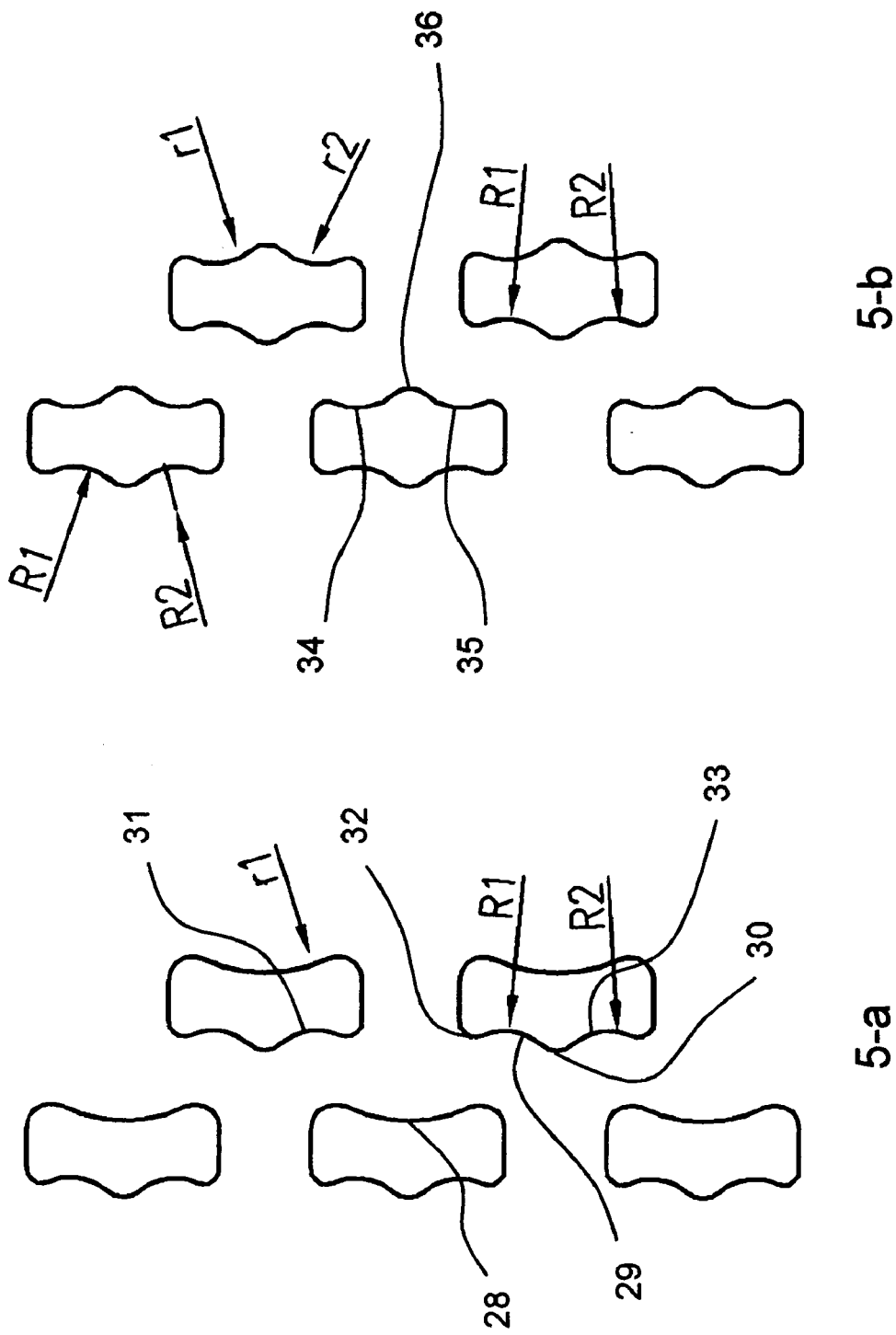
FIG. 5 illustrates two more different embodiments of the block designs with detailed structural attributes, respectively, in 5-$a$ and 5-$b$.

Since there would be more than one embodiment available for the present invention, two more embodiments of block designs are exemplarily chosen to present in FIG. 5. As shown in FIG. 5 5-*a*, the single convex back surface 25 of a block, as in FIG. 4, is replaced with two concave surfaces 29, 33 and the contour knobs 30, 32. Reactant flows deflected and split on the surface 28 are guided toward the surfaces 29, 31, and then guided by the surface 29 and the knobs 30, 32 into the gap behind in the next row. As illustrated in FIG. 5 5-*b*, shapes of the blocks, as another embodiment, are evolved from the ones shown in FIG. 5 5-*a*, but the single concave front surface 24, as marked in FIG. 4, is replaced with two concave surfaces 34, 35 and the splitting knob 36.

Figure 6:
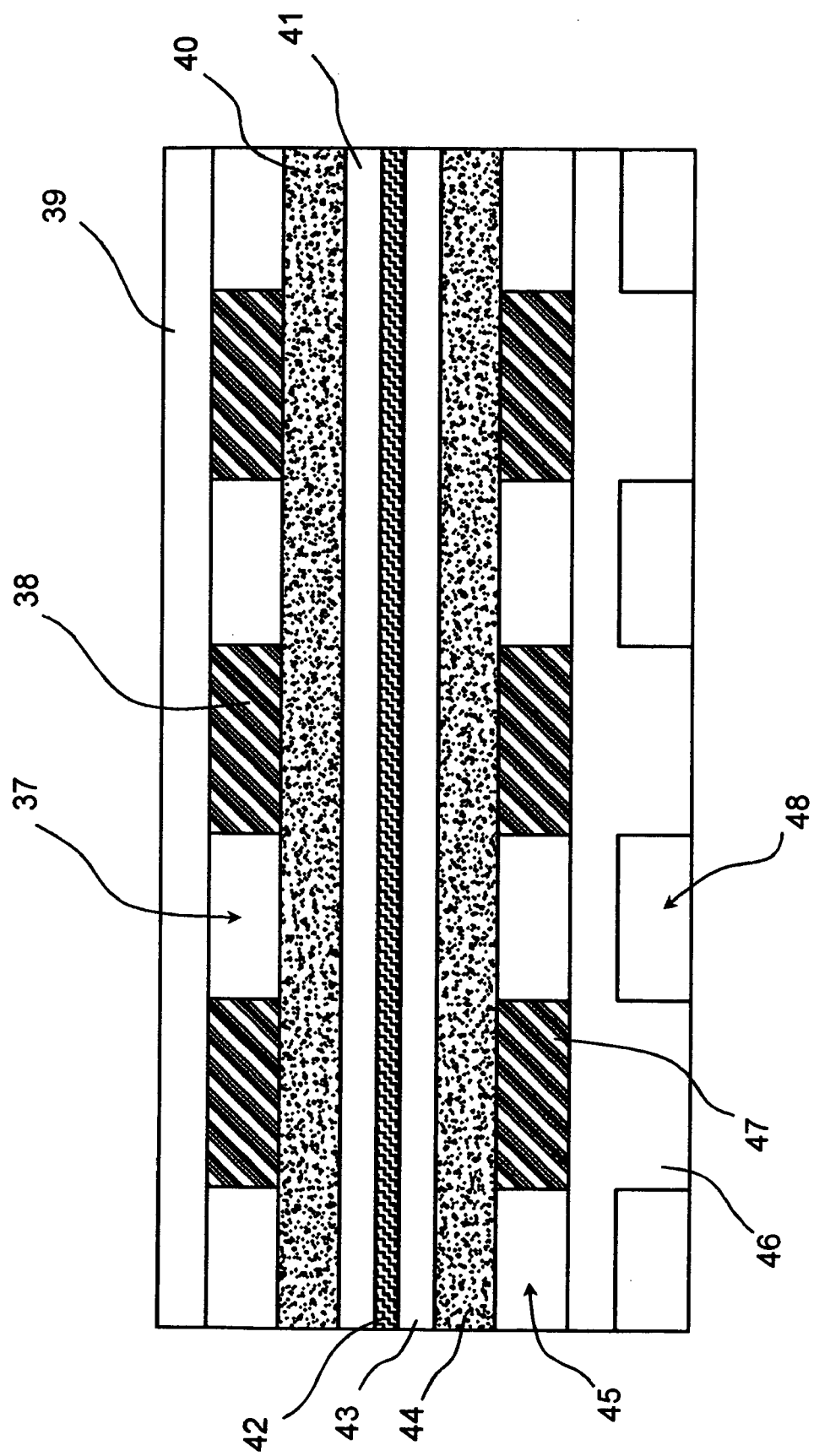
FIG. 6 depicts a cross-sectional, schematic view of the fuel cell with the bipolar plates according to the present invention.

As shown in FIG. 6, a fuel cell assembly is exemplarily structured with the base plates 39, 46, the blocks 38, 47 built on the plates, the porous media (gas diffusion layers, thereafter GDL) 40, 44, the catalyst layers (electrodes) 41, 43 and the membrane 42. The top surface 26 of the blocks, as marked in FIG. 4, on bipolar plates 1 as marked in FIG. 1, is pressed onto the GDL 40, 44, so that the multiple gas flow channels 37, 45 are formed between the bipolar plates and GDLs. Reactant flows, hydrogen-rich fuel and air, are fed into the channels 37, 45, diffusing through the GDL 40, 44, and then reach the catalyst layers 41, 43 on the membrane 42. The base plate 39, with blocks on one side and flat on the other side, often known as anode, and the plate 46, with blocks on one side and the coolant flow channels 48 on the other side, often known as cathode, are also called as separating plates which are built with all the blocks preferably together with the same material mostly.

Figure 7:
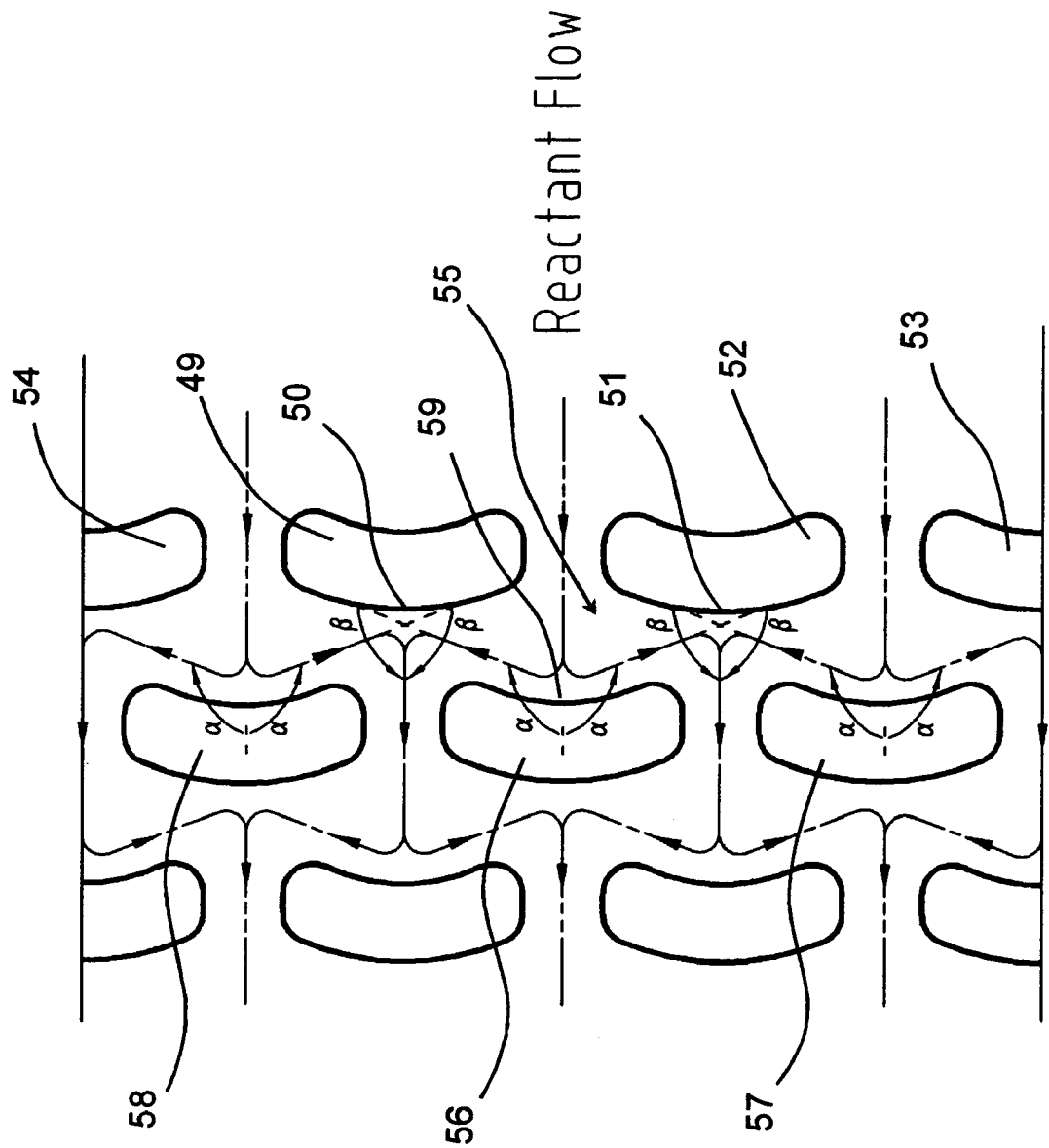
FIG. 7 is a schematic view of multiple channels formed by the blocks, to illustrate the reactant flow pattern: contraction, expansion, deflection and split, including flow direction changes by equal to or larger than 90° angles twice, as indicated by the phantom lines with arrows.

As illustrated in FIG. 7, reactant flows are forced to go through and contracted by the multiple gaps between the blocks 49, 52, 53, 54 in a row, then expanded within the spaces 55 between two rows. Since the blocks are laid out transversely right in the way of the main flow directions, the reactant flows are deflected completely by the blocks in front, 56, 57 and 58. The deflected flows, through the gap between the blocks 49, 52, are forced to be split along the center point 59 on the concave surface of the crescent block 56 into at least two flow streams. As indicated by phantom lines with arrows in FIG. 7, while splashing on the blocks 56, 57 and 58, the flows deflect their flow directions, by the angle α which is larger than or at least equal to 90°, away from the main flow direction, so that the split flow streams guided by the crescent shape move backwards and side way around. As a result, one part of the split flow streams, deflected from the block 56 and turning rightward (facing the block), will meet with a stream split from the block 58 and turning leftward on the back of the block 49 or in the space in front of the center point 50 on the block 49. The same flow pattern is formed elsewhere in the channels, such as in front of the point 51 in the other section.

Two meeting streams are merged together and forced by the convex backs of the blocks 49 to change their flow directions again, by the angle β which is also larger than or at least equal to 90°, back to the main flow direction, so that the deflected and merged streams are contracted again by the gaps between the blocks 56, 57 and 58 in the next row. It is seen that the bipolar plates built with the multiple flow channels in the present invention lead reactant flows go through the above flow pattern in the whole flow process within the fuel cell, therefore, the reactant flows, contracted, expanded, deflected, split and in constant disturbing conditions, are well distributed into all the space within the multiple channels.

Figure 8:
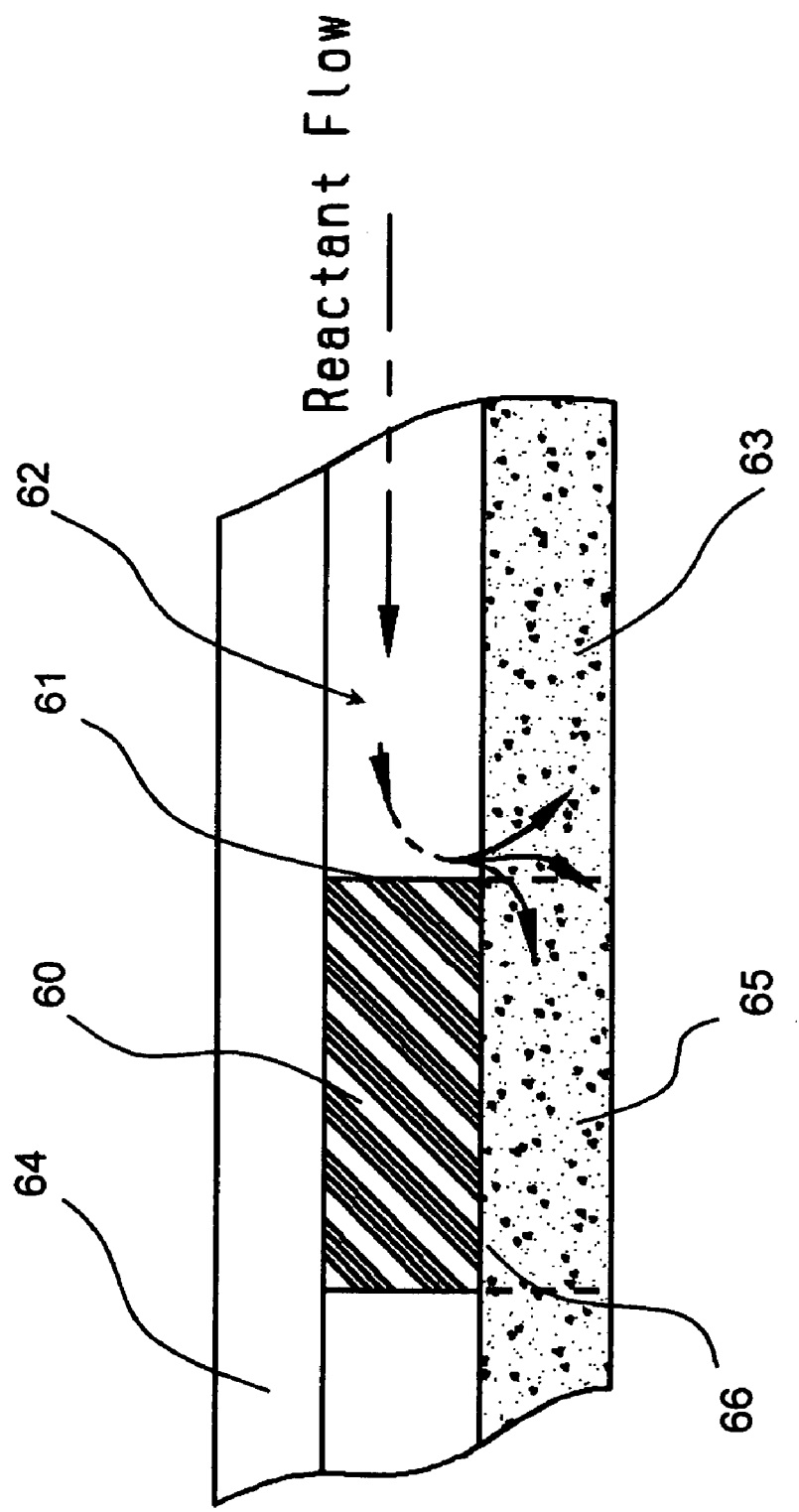
FIG. 8 is a partial schematic cross section view of a fuel cell flow channel and GDL, in which the reactant flows, going through the channels, hit on the block in front, are forced to change flow directions. One of direction changes is toward the gas diffusion layer (GDL), as indicated by the dot line with three arrows, according to the present invention.

As shown in FIG. 8, reactant flows in the channels 62 constantly hit against the crescent front surface 61 of the blocks 60 on the plate 64, so that the flows are forced to find all other possible ways to move forward. Besides splitting into at least two streams mentioned above, due to local flow pressure and velocity changes, the flows also press onto GDL 63 to find its way to move forward. As a result, such moving trend is indeed improving micro flows patterns and diffusion process in GDL 63. As illustrated with multiple arrows and a dash line in FIG. 8, by deflecting flows in the channels in all directions, the bipolar plates in the present invention can improve the flow distributions into landing area 65 (between two vertical dash lines) under the top surface 66 of the block 60 against the GDL 63.

Figure 9:
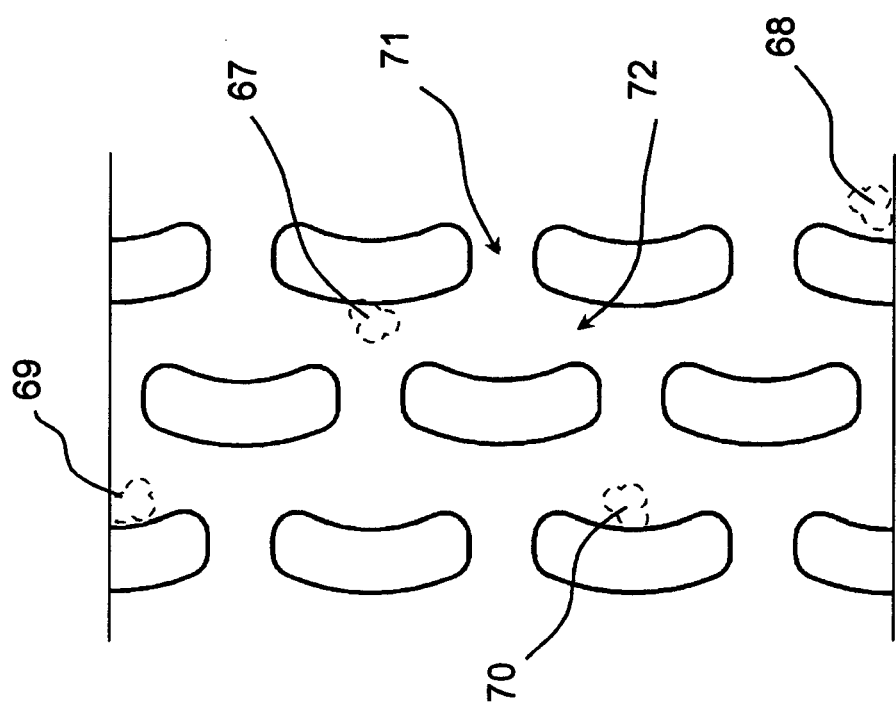
FIG. 9 illustrates possible local area or locations in the channels where liquid water droplets may form, accumulate and reside, and narrow passages between the blocks, according to the present invention.

Instead of removing all water from channels, bipolar plates in the present invention is to localize water drops and limit the size of the droplets for improving water management. As indicated in FIG. 9, the area circled by the dash curve lines 67, 68, 69, 70 are potential locations where liquid water droplets may accumulate and reside. The bipolar plates are designed in the way to leave some local area for residence of water droplets as humidity resource to compensate dryness of flows or the membrane whenever need. The present invention is to have local water pockets resided along with higher velocity flow streams through the narrow gaps 71 and passages 72 in the multiple channels to prevent water droplets from growing to be a big slug that may plug a channel, or delay droplets from growing too fast before any purging means is used. The multiple channel bipolar plate design in the present invention can also tolerate a local section of a channel being plugged by water slugs for a longer time without major performance loss, since the multiple channels in the present invention provide multiple flow passages in such shapes that the possible water pockets are localized effectively.

While this invention is exemplarily presented above in connection with particular figures and examples thereof, the actual scope of this invention should not be limited since many different modifications will become apparent to the skill practitioner upon a study of detailed concepts in the drawings, descriptions and claims below.

What is claimed is:

1. A flow field plate assembly for distributing a reactant fluid to an electrode in a fuel cell, comprising:
   a base plate, as a separator, having at least one working face;
   a plurality of blocks on the working face of the base plate arranged in a plurality of rows and in a repeating and staggered pattern having a first gap with a first distance between two adjacent blocks in a row and a second gap with a second distance between two adjacent rows, each of the plurality of blocks having a front surface facing an upcoming reactant flow and a rear surface facing a downstream reactant flow, a size and a shape of the block and the first and the second distances being configured such that the reactant flow hitting against the front surface of a block is deflected and split into at least two flow streams at the central point of the block, and the reactant flow streams are forced to go through the first gaps and continue to be deflected, split and disturbed in the second gap by the rear surface of the block and the block in the next row;
   a gas diffusion layer in contact with a top surface of each of the plurality of blocks; and
   a plurality of flow distributing channels formed by and between the blocks, wherein the reactant flow going through the flow distributing channels is deflected, split, contracted and expanded in a constant distributing mode such that the reactant flow is well distributed within the flow distributing channels.

2. The flow field plate of claim 1, wherein blocks are arranged in a repeating and staggered pattern such that longer dimensions of blocks are aligned in a direction transverse to the reactant flow direction, and a centerline of the block in a second row coincides with a centerline of a gap between two adjacent blocks in a first row.

3. The flow field plate of claim 1, wherein the block has a crescent shape with a single concave front surface and a single convex rear surface.

4. The flow field plate of claim 1, wherein the block is a wavy curved shape having a single concave front surface and a rear surface with at least two concave shaped surfaces and at least one contour splitting knob.

5. The flow field plate of claim 1, wherein the block is a wavy curved shape having a front and a rear surfaces with at least two concave shaped surfaces and at least one contour splitting knob.

6. The flow field plate of claim 1, wherein the front surface of the block deflects the reactant flow by larger than or equal to 90° with respect to the reactant flow direction, and the rear surface of the block deflects the react flow by larger than or equal to 90° with respect to the reactant flow direction.

7. The flow field plate of claim 1, wherein the block has height, width, and thickness such that the ratio of width over thickness is about 3 to 1.

8. A flow field plate assembly for distributing a reactant fluid to an electrode in a fuel cell, comprising:
   a base plate, as a separator, having at least one working face;
   a plurality of blocks on the working face of the base plate arranged in a plurality of rows and in a repeating and staggered pattern having a first gap with a first distance between two adjacent blocks in a row and a second gap with a second distance between two adjacent rows, each of the plurality of blocks having a single concave front surface facing an upcoming reactant flow and a rear surface with at least two concave shaped surfaces and at least one contour splitting knob facing a downstream reactant flow, a size and a shape of the block and the first and the second distances being configured such that the reactant flow hitting against the front surface of a block is deflected and split into at least two flow streams at the central point of the block, and the reactant flow streams are forced to go through the first gaps and continue to be deflected, split and disturbed in the second gap by the rear surface of the block and the block in the next row;
   a gas diffusion layer in contact with a top surface of each of the plurality of blocks; and
   a plurality of flow distributing channels formed by and between the blocks, wherein the reactant flow going through the flow distributing channels is deflected, split, contracted and expanded in a constant distributing condition such that the reactant flow is well distributed within the multiple channels.

9. The flow field plate of claim 8, wherein blocks are arranged in a repeating and staggered pattern such that longer dimensions of blocks are aligned in a direction transverse to the reactant flow direction, and a centerline of the block in a second row coincides with a centerline of the first gap between two adjacent blocks in a first row.

10. The flow field plate of claim 8, wherein the front surface of the block deflects the reactant flow by larger than or equal to 90° with respect to the reactant flow direction, and the rear surface of the block deflects the react flow by larger than or equal to 90° with respect to the reactant flow direction.

11. The flow field plate of claim 8, wherein the block has height, width, and thickness such that the ratio of width over thickness is about 3 to 1.

12. A flow field plate assembly for distributing a reactant fluid to an electrode in a fuel cell, comprising:
   a base plate, as a separator, having at least one working face;
   a plurality of blocks on the working face of the base plate arranged in a plurality of rows and in a repeating and staggered pattern having a first gap with a first distance between two adjacent blocks in a row and a second gap with a second distance between two adjacent rows, each of the plurality of blocks having a front surface with at least two concave shaped surfaces and at least one contour splitting knob facing an upcoming reactant flow and a rear surface with at least two concave shaped surfaces and at least one contour splitting knob facing a downstream reactant flow, a size and a shape of the block and the first and the second distances being configured such that the reactant flow hitting against the front surface of a block is deflected and split into at least two flow streams at the central point of the block, and the reactant flow streams are forced to go through the first gaps and continue to be deflected, split and disturbed in the second gap by the rear surface of the block and the block in the next row;
   a gas diffusion layer in contact with a top surface of each of the plurality of blocks; and
   a plurality of flow distributing channels formed by and between the blocks, wherein the reactant flow going through the flow distributing channels is deflected, split, contracted and expanded in a constant distributing condition such that the reactant flow is well distributed within the multiple channels.

13. The flow field plate of claim 12, wherein blocks are arranged in a repeating and staggered pattern such that longer dimensions of blocks are aligned in a direction transverse to the reactant flow direction, and a centerline of the block in a second row coincides with a centerline of the first gap between two adjacent blocks in a first row.

14. The flow field plate of claim 12, wherein the front surface of the block deflects the reactant flow by larger than or equal to 90° with respect to the reactant flow direction, and the rear surface of the block deflects the react flow by larger than or equal to 90° with respect to the reactant flow direction.

15. The flow field plate of claim 12, wherein the block has height, width, and thickness such that the ratio of width over thickness is about 3 to 1.

* * * * *